United States Patent
Roth

(10) Patent No.: US 12,533,920 B2
(45) Date of Patent: Jan. 27, 2026

(54) LEAF SPRING DEVICE, LEAF SPRING, AND SHOCK ABSORBER ASSEMBLY

(71) Applicant: Rheinmetall Invent GmbH, Neuss (DE)

(72) Inventor: Ingo Roth, Pfedelbach (DE)

(73) Assignee: Rheinmetall Invent GmbH, Neuss (DE)

(*) Notice: Subject to any disclaimer, the term of this patent is extended or adjusted under 35 U.S.C. 154(b) by 385 days.

(21) Appl. No.: 18/033,016

(22) PCT Filed: Oct. 22, 2021

(86) PCT No.: PCT/EP2021/079405
§ 371 (c)(1),
(2) Date: Apr. 20, 2023

(87) PCT Pub. No.: WO2022/084535
PCT Pub. Date: Apr. 28, 2022

(65) Prior Publication Data
US 2023/0373261 A1  Nov. 23, 2023

(30) Foreign Application Priority Data
Oct. 22, 2020 (DE) .................. 10 2020 127 864.0

(51) Int. Cl.
*B60G 15/02* (2006.01)
*F16F 1/368* (2006.01)

(52) U.S. Cl.
CPC .............. *B60G 15/02* (2013.01); *F16F 1/368* (2013.01); *B60G 2206/428* (2013.01); *B60G 2401/10* (2013.01); *B60G 2500/10* (2013.01); *F16F 2224/0283* (2013.01)

(58) Field of Classification Search
None
See application file for complete search history.

(56) References Cited

U.S. PATENT DOCUMENTS

| | | | |
|---|---|---|---|
| 2002/0135112 A1* | 9/2002 | Allaei | D03D 49/025 267/136 |
| 2014/0042680 A1* | 2/2014 | Glover | F16F 1/3686 29/419.1 |
| 2018/0195570 A1* | 7/2018 | Churchill | F16F 1/22 |

FOREIGN PATENT DOCUMENTS

| | | | |
|---|---|---|---|
| CN | 106678241 B | * 12/2018 | ............. F16F 7/104 |
| DE | 100 29 332 A1 | 1/2002 | |
| DE | 10 2010 042 459 A1 | 5/2011 | |
| DE | 10 2018 101 736 A1 | 7/2019 | |
| DE | 10 2019 129 581 A1 | 5/2021 | |
| EP | 2472137 A2 | 7/2012 | |
| EP | 2933526 A2 | * 10/2015 | ............... F16F 1/22 |

(Continued)

OTHER PUBLICATIONS

CN-106678241-B: English Machine Translation (Year: 2018).*

(Continued)

*Primary Examiner* — Melanie Torres Williams
(74) *Attorney, Agent, or Firm* — Caldwell Intellectual Property Law

(57) ABSTRACT

A leaf spring device for a motor vehicle, comprising a leaf spring unit made of a fiber composite plastic, and a piezo element arrangement which is attached to the leaf spring unit, wherein the piezo element arrangement is configured to generate an electric voltage in response to a deformation of the leaf spring unit.

13 Claims, 8 Drawing Sheets

(56) References Cited

FOREIGN PATENT DOCUMENTS

| | | |
|---|---|---|
| EP | 3 517 800 A1 | 7/2019 |
| EP | 2 472 137 B1 | 10/2019 |
| JP | 5721847 U | 2/1982 |
| JP | 62255634 A * | 12/1987 |
| JP | 2011126405 A | 6/2011 |
| JP | 2012131406 A | 7/2012 |

OTHER PUBLICATIONS

JP-62255634-A: English Machine Translation (Year: 1987).*
Japanese Patent Application No. 2023-549006; Japanese Office Action; Date Mar. 29, 2024.

* cited by examiner

LEAF SPRING DEVICE, LEAF SPRING, AND SHOCK ABSORBER ASSEMBLY

CROSS-REFERENCE TO RELATED APPLICATIONS

This application is for entry into the U.S. National Phase from which priority is claimed under all applicable sections of Title 35 of the United States Code including, but not limited to, Sections 120, 363, and 365 (c) to International Application Serial No. PCT/EP2021/079405, filed on Oct. 22, 2021 and entitled "LEAF SPRING DEVICE, LEAF SPRING, AND SHOCK ABSORBER ASSEMBLY," which in turn claims priority to German Patent Application Serial No. DE 10 2020 127 864.0, filed on Oct. 22, 2020 and entitled "BLATTFEDERVORRICHTUNG SOWIE BLATTFEDER UND DÄMPFERANORDNUNG." Each of International Application Serial No. PCT/EP2021/079405 and German application Serial No. DE 10 2020 127 864.0 is incorporated by reference herein in its entirety.

FIELD OF THE INVENTION

The present invention relates to a leaf spring device for a motor vehicle, and to a leaf spring and damper assembly comprising such a leaf spring device.

BACKGROUND

Active suspensions for motor vehicles may include an actively controlled damper and, if applicable, an actively controlled air spring. In such motor vehicles, the damping can be adjusted depending on a predefined driving profile, such as comfort, normal or dynamic, and thus influence the driving behavior. The same applies to the air spring. It is not possible, or at least only possible to a limited extent, to determine dynamic loads with systems of this type. This also means that it is not possible to intervene in driving situations in a load-sensitive manner.

The applicant is aware of in-house prior art based on sensors that are placed in addition to existing chassis components to detect changes in load. These sensors are usually powered by external energy sources and require physical coupling to the motor vehicle. The sensors require voltage and signal transmission. Additional components require additional installation space and usually provide only one input parameter for the chassis control system. The additional components increase the weight, especially the unsprung masses, which can have a detrimental effect on ride comfort and safety. Furthermore, additional components and their coupling with the existing chassis components are also cost-intensive and error-prone.

With this in mind, one object of the present invention is to provide an improved leaf spring device.

SUMMARY OF THE DISCLOSURE

Accordingly, a leaf spring device for a motor vehicle is proposed. The leaf spring device comprises a leaf spring unit made of a fiber composite plastic, and a piezo element arrangement attached to the leaf spring unit, wherein the piezo element arrangement is configured to generate an electric voltage in response to a deformation of the leaf spring unit.

Because the piezo element arrangement is provided on the leaf spring unit, it is possible to detect the load or deformation of the leaf spring device directly and in real time. This can be done with the help of the generated voltage. It is thus possible to determine both the load and the loading of a motor vehicle with such a leaf spring device and, on the basis of this data, to influence, for example, both the spring characteristic curve of the leaf spring device and the damper characteristic curve of a damper of the motor vehicle. This improves the driving comfort. Furthermore, in addition to determining the load on the leaf spring unit, energy recovery is also possible at the same time.

In the present context, a "leaf spring unit" is to be understood as a spring or spring element which is constructed from a plurality of leaf spring elements or leaf spring sections which are connected to one another and thus preferably form a zigzag or meander-shaped geometry. The individual leaf spring sections may have a leaf-shaped or plate-shaped geometry. "Leaf-shaped" or "plate-shaped" does not, however, preclude the leaf spring sections from being curved or of any three-dimensional shape. In contrast to the leaf spring unit, a cylindrical spring or coil spring has a continuous wire that is helically shaped such that the coil spring has a cylindrical geometry.

The leaf spring unit is preferably a compression spring. However, the leaf spring unit may also be a tension spring. The leaf spring device differs from the leaf spring unit in that the leaf spring device comprises both the leaf spring unit and the piezo element arrangement. That is, the leaf spring unit and the piezo element arrangement are part of the leaf spring device. The piezo element arrangement, on the other hand, is not part of the leaf spring unit. However, this does not preclude the piezo element arrangement from being attached or secured to the leaf spring unit. The leaf spring device may comprise a plurality of leaf spring units.

The fiber reinforced plastic (FRP) may also be referred to as fiber reinforced plastic material. The fiber reinforced plastic comprises a plastic material, in particular a plastic matrix, in which fibers, for example natural fibers, glass fibers, carbon fibers, aramid fibers or the like, are embedded. The plastic material may be a thermoset, such as an epoxy resin. However, the plastic material may also be a thermoplastic. The fibers may be continuous fibers. However, the fibers may also be short or medium length fibers, which may have a fiber length of a few millimeters to a few centimeters. The fibers may be arranged directionally or non-directionally in the plastic material. The leaf spring unit may have a layered or laminated structure. For this purpose, for example, layers of fiber fabric or fiber scrim are impregnated with the plastic material. Alternatively, however, so-called prepregs, i.e. pre-impregnated fibers, fiber fabrics or fiber scrims, can be used to manufacture the leaf spring unit.

The fact that the piezo element arrangement is "attached" to the leaf spring unit means in particular in the present case that the piezo element arrangement is preferably firmly connected to the leaf spring unit. For example, the piezo element arrangement is bonded to the leaf spring unit. "Attached" may, however, also mean that the piezo element arrangement only abuts or rests on the leaf spring unit. "Attached" as used herein also includes embodiments in which the piezo element arrangement is an integral part of the leaf spring unit. "Integral" may mean in the present embodiment that the piezo element arrangement is surrounded at least in sections by the fiber composite plastic, in particular by the plastic material or the plastic matrix. The piezo element arrangement may also be at least partially covered by fiber layers of the fiber composite plastic. "Attached" in summary in the broadest sense means in particular that there is contact between the leaf spring unit and the piezo element arrangement, so that forces can be transmitted between the leaf spring unit and the piezo element arrangement.

In the present context, a "piezo element" is to be understood as a component which exploits the so-called piezo effect in order either to execute a mechanical movement by applying an electrical voltage or to produce an electrical voltage when a mechanical force is applied. That is, when a current is applied to the piezo element arrangement, the latter can influence the leaf spring unit in such a way that, for example, its spring stiffness or spring constant is changed. Conversely, a change in voltage at the piezo element arrangement can be inferred from a deformation of the leaf spring unit.

Preferably, however, the piezo element arrangement is also elastically deformed when the leaf spring unit is deformed, so that the electrical voltage is generated due to the deformation of the leaf spring unit. The piezo element arrangement thus converts deformation energy into electrical energy. Any load or loading of the leaf spring unit results in deformation thereof, at least on a microscopic scale. Any deformation of the leaf spring unit further results in the piezo element arrangement generating an electrical voltage. Any number of piezo element arrangements may be provided. The leaf spring unit also deforms during accelerations in the direction of travel, lateral accelerations and decelerations, for example during a braking process. This means that accelerations in the direction of travel, transverse accelerations and decelerations can also be detected with the aid of the piezo element arrangement.

According to one embodiment, the piezo element arrangement is attached to an end section of the leaf spring unit provided at the end of the leaf spring unit.

For example, the piezo element arrangement is bonded to the end section. However, the piezo element arrangement may also be attached to any other region of the leaf spring unit. However, the piezo element arrangement need not be fixedly attached to the end section. As a result, the leaf spring unit can be easily replaced without replacing the piezo element arrangement. The piezo element arrangement may be fixedly connected to a bearing unit receiving the end section. For example, the piezo element arrangement is glued into the bearing unit, in particular into a receiving pocket of the bearing unit.

According to a further embodiment, the leaf spring unit comprises a first end section to which a first piezo element arrangement is attached and a second end section to which a second piezo element assembly is attached.

The second piezo element arrangement is optional. That is, the leaf spring unit comprises at least the first piezo element arrangement provided at the first end section. With respect to a direction of gravity, the first end section may be disposed above the second end section. In this case, the first piezo element arrangement is placed above the first end section as viewed along the direction of gravity. The second piezo element arrangement is arranged below the second end section with respect to the direction of gravity. This arrangement ensures that a force acting on the leaf spring device also acts on the piezo element arrangements.

According to a further embodiment, the leaf spring unit further comprises a bearing unit in which the end section is received, wherein the piezo element arrangement is arranged between the bearing unit and the end section.

Preferably, a first bearing unit is provided with which the first end section is associated. Accordingly, a second bearing unit is provided with which the second end section is associated. The bearing units may also be referred to as spring shoes. The end sections may be glued into the respective bearing unit or otherwise fixedly connected thereto. For example, the first bearing unit may be part of a frame of the motor vehicle. The second bearing unit may be part of an axle guide of the motor vehicle. With respect to the direction of gravity, the first bearing unit is arranged above the second bearing unit.

According to a further embodiment, the leaf spring unit comprises a plurality of leaf spring sections and a plurality of deflection sections, wherein in each case one deflection section connects two adjacent leaf spring sections to one another.

Thus, the leaf spring sections and the deflection sections are arranged alternately. The leaf spring sections preferably have an S-shaped geometry in cross-section. The leaf spring sections are arranged such that the leaf spring unit has the aforementioned zigzag or meander geometry. The leaf spring sections may be integrally connected to each other, in particular integrally made of one material, by means of the deflection sections. "Integrally." or "one-piece" means in the present case that the leaf spring sections and the deflection sections form a common component and are not composed of different components. "Integrally made of one material" means, in particular, in the present case that the leaf spring sections and the deflection sections are manufactured from the same material throughout. Preferably, the deflection sections have a larger cross-sectional area than the leaf spring sections. This ensures that, when the leaf spring unit compresses, it is essentially the leaf spring sections and not the deflection sections that deform resiliently. Alternatively, the leaf spring sections may be connected to each other by means of clip-shaped deflection sections. In this case, the leaf spring unit is neither formed integrally nor formed integrally made of one material.

According to a further embodiment, the deflection sections comprise a higher stiffness than the leaf spring sections.

In particular, the deflection sections have a much higher stiffness compared to the leaf spring sections. This can be achieved, for example, by increasing the cross-section in the area of the deflection sections. This reliably prevents the deflection sections from deforming when the leaf spring unit compresses. The spring effect is thus preferably achieved exclusively by the leaf spring sections. The deflection sections are thus deactivated zones of the leaf spring unit, or may be designated as such. The "stiffness" describes the resistance of a body, in this case the forming section, to elastic deformation.

According to a further embodiment, the piezo element arrangement is attached to at least one of the deflection sections.

For example, the piezo element assembly is bonded to the deflection section. A plurality of such piezo element arrangements may be provided, which are provided on a plurality of deflection sections. Individual deflection sections may also be selectively equipped with piezo element arrangements.

According to a further embodiment, the piezo element arrangement is attached to an outer radius of the at least one deflection section, and/or the piezo element arrangement is attached to an inner radius of the at least one deflection section, which inner radius faces away from the outer radius.

The outer radius faces outwardly away from two adjacent leaf spring sections. The inner radius is provided on the inside of the deflection section and faces two adjacent leaf spring sections. In particular, the outer radius is larger than the inner radius. For example, exactly one piezo element arrangement may be provided at the outer radius, exactly one piezo element arrangement may be provided at the inner radius, or piezo element arrangements may be provided at both the outer radius and the inner radius.

According to a further embodiment, the piezo element arrangement is arranged inside at least one of the deflection sections.

"Inside" in this case means that the piezo element arrangement is surrounded, at least in sections, by material of the deflection section. In this case, the piezo element arrangement is integrated into the deflection section. In other words, the piezo element arrangement is surrounded at least in sections by the fiber composite plastic, in particular by the plastic material or the plastic matrix of the fiber composite plastic. For example, the piezo element arrangement is covered by an outermost or innermost layer of the fiber composite plastic. In this regard, the piezo element arrangement may be disposed near the outer radius or near the inner radius. The piezo element arrangement may thus be laminated into the leaf spring unit, in particular into a deflection section of the leaf spring unit.

According to a further embodiment, the piezo element arrangement comprises a plurality of piezo elements arranged in a matrix-like manner.

The arrangement of the piezo elements may also be referred to as a mat-like arrangement. The piezo element arrangement may therefore also be referred to as a piezo element matrix or piezo element mat. "Matrix-like" in the present context means that a plurality of piezo elements are arranged in rows and columns side by side and one above the other. The individual piezo elements may be interconnected. For this purpose, for example, a plastic material, rubber or the like can be used in which the piezo elements are at least partially embedded.

According to a further embodiment, the leaf spring device further comprises a detection and evaluation apparatus which is configured to detect and evaluate the electrical voltage generated by the piezo element arrangement to generate data which describe the deformation of the leaf spring unit.

The detection and evaluation apparatus is also suitable, for example, for comparing predefined parameters with the generated data, so that it is possible to understand, for example, on the basis of the generated electrical voltage, under what load the leaf spring unit is or how much the leaf spring unit is compressed. The detection and evaluation apparatus may also be suitable for feeding the electrical voltage into the motor vehicle, for example into an energy storage device of the motor vehicle. In this case, recuperation can take place.

According to a further embodiment, the detection and evaluation apparatus is configured to describe a loading state and/or a deflection of the leaf spring unit.

The "loading state" can be understood to mean, for example, the force acting on the leaf spring unit, for example due to a load on the motor vehicle. The "spring deflection" or the "deflection" is to be understood as the distance by which the leaf spring unit is shortened from an unloaded state to a loaded or sprung state. By "describing" it is to be understood, for example, that the detection and evaluation apparatus outputs by how much the leaf spring unit is compressed.

According to a further embodiment, the electrical voltage generated by the piezo element arrangement serves to transmit the data.

This means that the piezo element arrangement functions on the one hand as a sensor and on the other hand as a voltage supplier. An additional energy source can be dispensed with. This means that the leaf spring device operates autonomously without an external energy supply.

Further, a leaf spring and damper arrangement comprising a damper and such a leaf spring device is proposed. In this case, the piezo element arrangement is operatively connected to the damper in such a way that a damper characteristic of the damper changes as a function of the electrical voltage.

For example, a valve of the damper can be controlled with the aid of the electrical voltage. Furthermore, the electrical voltage can be used to influence the properties of an electrorheological or magnetorheological material which the damper comprises. The damper can thus become harder or softer depending on a deformation of the leaf spring unit, for example. This significantly increases driving comfort.

According to one embodiment, the piezo element arrangement and the damper are operatively connected in such a way that the piezo element arrangement and the damper cooperate autonomously.

In the present context, "autonomously" means that the leaf spring and damper arrangement is neither supplied with external energy nor do signals or data from a central vehicle control system have to be used to influence the damper characteristic curve. This significantly reduces the amount of wiring required.

"One" as used herein is not necessarily to be understood as being limited to exactly one element. Rather, multiple elements, such as two, three or more, may also be provided. Also, any other counting word used herein is not to be understood as limiting the number of elements to exactly that number. Rather, numerical variations upward and downward are possible unless otherwise indicated.

Further possible implementations of the leaf spring device and/or the leaf spring and damper arrangement also comprise combinations, not explicitly mentioned, of features or embodiments described before or below with respect to the embodiments. In this regard, the skilled person will also add individual aspects as improvements or additions to the respective basic form of the leaf spring device and/or the leaf spring and damper arrangement.

Further advantageous embodiments and aspects of the leaf spring device and/or the leaf spring and damper arrangement are the subject of the subclaims, as well as the embodiments of the leaf spring device and/or the leaf spring and damper arrangement described below. Further, the leaf spring device and/or the leaf spring and damper arrangement will be explained in more detail by means of preferred embodiments with reference to the accompanying figures.

BRIEF DESCRIPTION OF THE DRAWINGS

In the figures, identical or functionally identical elements have been provided with the same reference signs, unless otherwise indicated.

DETAILED DESCRIPTION

Figure 1:
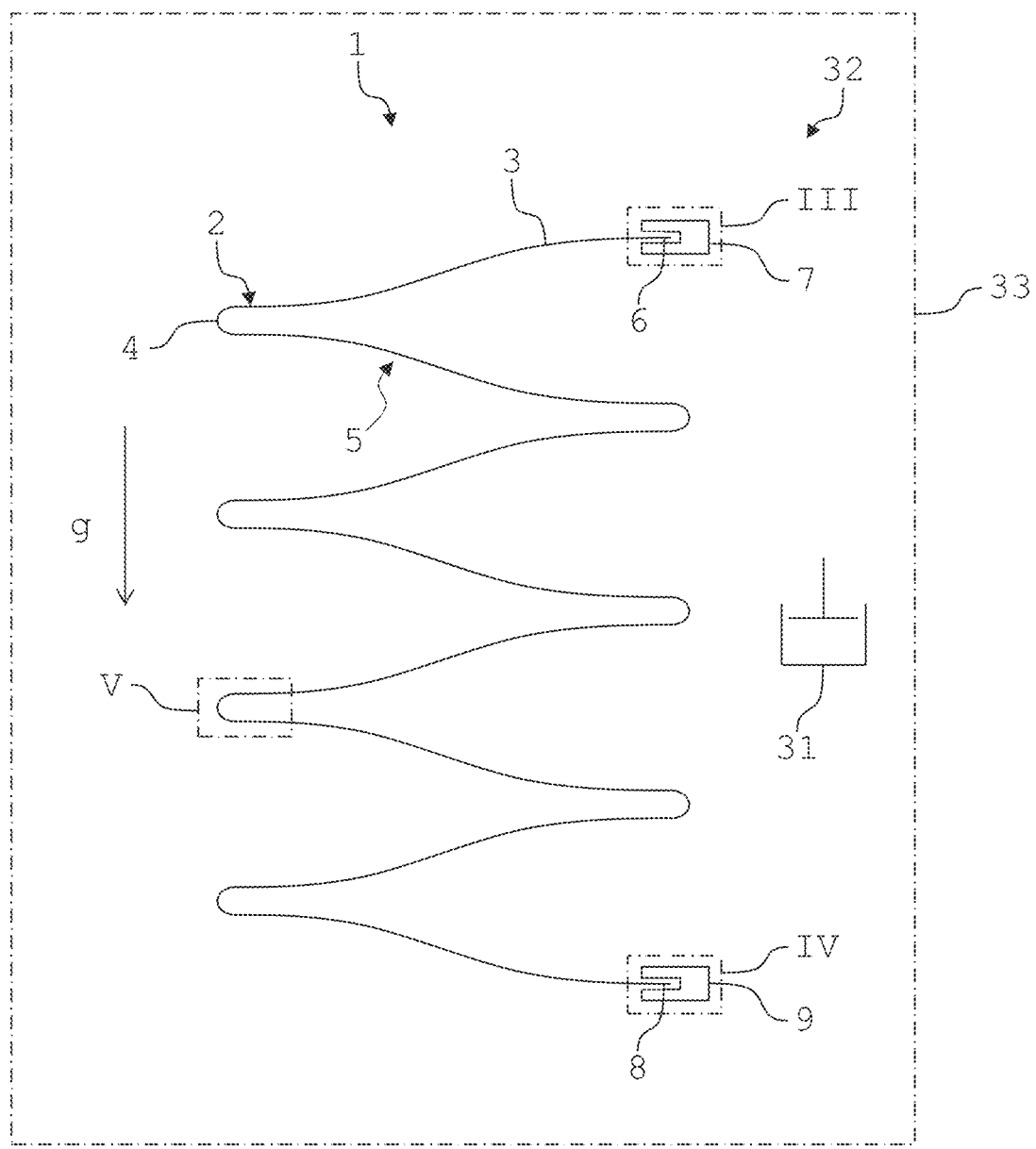
FIG. 1 shows a schematic view of an embodiment of a leaf spring device.

FIG. 1 shows a schematic view of a leaf spring device 1. The leaf spring device 1 is suitable for use on a motor vehicle, in particular on a wheeled vehicle. The leaf spring device 1 can be used in the area of a wheel suspension of the motor vehicle.

The leaf spring device 1 comprises a leaf spring unit 2, which is made of a fiber reinforced plastic material or a fiber reinforced composite plastic (FRP). The leaf spring device 1 may comprise a plurality of leaf spring units 2. The fiber-reinforced plastic comprises a plastic material, in particular a plastic matrix, in which fibers, for example natural fibers, glass fibers, carbon fibers, aramid fibers or the like, are embedded. The plastic material may be a thermoset, such as an epoxy resin. However, the plastic material may also be a thermoplastic. The fibers may be continuous fibers. However, the fibers may also be short or medium length fibers, which may have a fiber length of a few millimeters to a few centimeters.

The leaf spring unit 2 has a meandering geometry. The leaf spring unit 2 has a plurality of leaf spring sections 3 which are connected to each other at deflection sections 4. The number of leaf spring sections 3 is arbitrary. In FIG. 1, only one leaf spring section 3 and one deflection section 4 are provided with a reference sign in each case. The individual leaf spring sections 3 each have an S-shaped geometry or have an S-shaped course in the side view.

The leaf spring sections 3 and the deflection sections 4 are designed in such a way that, when the leaf spring unit 2 is subjected to a load, no deformation, or at least no appreciable deformation, takes place in the deflection sections 4. The leaf spring sections 3, on the other hand, are each deformed in a central region 5 and generate a spring force counteracting a load acting from the outside.

A first end section 6 of the leaf spring unit 2 is supported in a first bearing unit 7. A second end section 8 of the leaf spring unit 2 is accordingly supported in a second bearing unit 9. The first bearing unit 7 may, for example, be part of a frame of the motor vehicle. The second bearing unit 9 may be part of an axle guide of the motor vehicle. The bearing units 7, 9 are part of the leaf spring device 1. With respect to a direction of gravity g, the first bearing unit 7 is placed above the second bearing unit 9. The bearing units 7, 9 are spring shoes or may be referred to as such.

Figure 2:
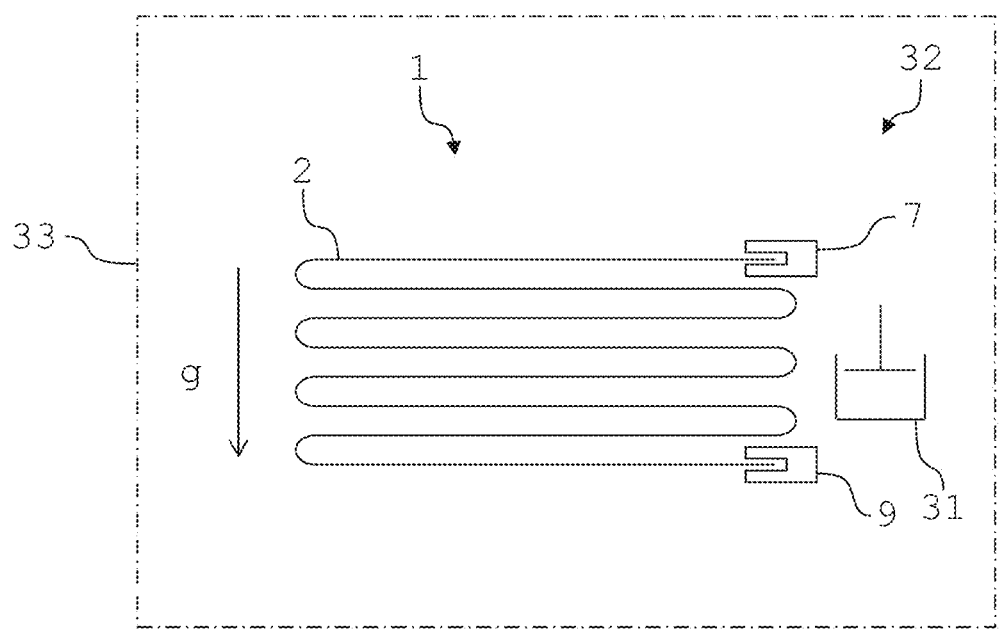
FIG. 2 shows another schematic view of the leaf spring device according to FIG. 1.

FIG. 1 shows the leaf spring device 1 in an unloaded or deflected state. In contrast, FIG. 2 shows the leaf spring device 1 in a compressed state. In the compressed state, the leaf spring sections 3, which are S-shaped in the unloaded state, have a planar shape.

Figure 3:
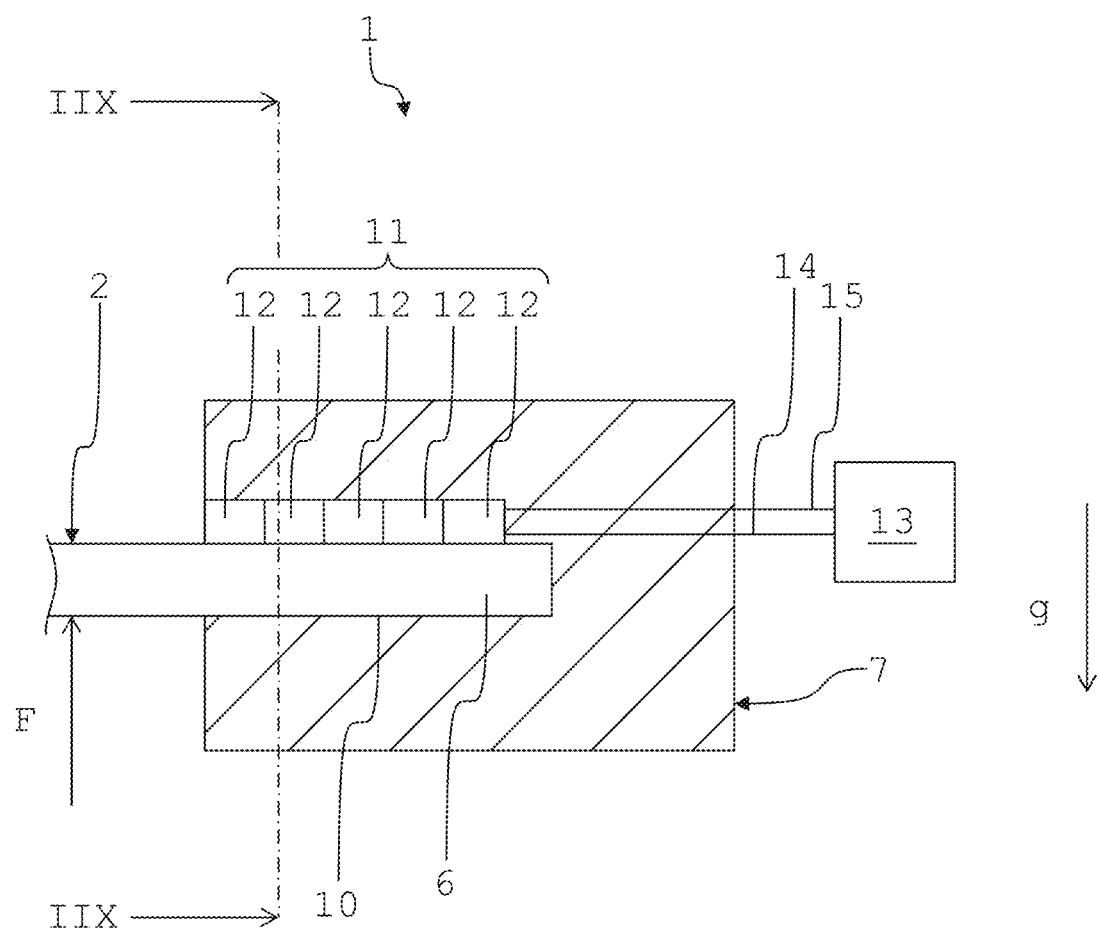
FIG. 3 shows the detailed view III according to FIG. 1.

FIG. 3 shows the detailed view III according to FIG. 1. As can be seen from FIG. 3, the first bearing unit 7 may be constructed to receive the first end section 6 of the leaf spring unit 2 therein. For this purpose, the first bearing unit 7 may comprise a receiving pocket 10. For example, the first end section 6 is glued into the receiving pocket 10. However, the connection between the first end section 6 and the first bearing unit 7 may be realized in any other way.

As viewed in the direction of gravity g, a piezo element arrangement 11 is placed above the first end section 6. The piezo element arrangement 11 comprises a plurality of piezo elements 12 arranged in a matrix-like or mat-like manner. The piezo element arrangement 11 may therefore also be referred to as a piezo element mat. In the present context, a "piezo element" is to be understood as a component which exploits the so-called piezo effect in order either to execute a mechanical movement by applying an electrical voltage or to produce an electrical voltage when a mechanical force is applied.

The piezo element arrangement 11 is part of the leaf spring device 1. The piezo element arrangement 11 is placed between the first end section 6 and the first bearing unit 7, so that a force F acting on the leaf spring unit 2 also acts on the piezo element arrangement 11. Preferably, the piezo element arrangement 11 is bonded into the receiving pocket 10. This allows the leaf spring unit 2 to be replaced without disassembling the piezo element arrangement 11. However, the piezo element arrangement 11 may also be fixedly connected to the end section 6.

The piezo element arrangement 11 is associated with a detection and evaluation apparatus 13 which is coupled to the piezo element arrangement 11 by means of electrical lines 14, 15. The detection and evaluation apparatus 13 is suitable for detecting and evaluating an electrical voltage generated by the piezo element arrangement 11.

Figure 4:
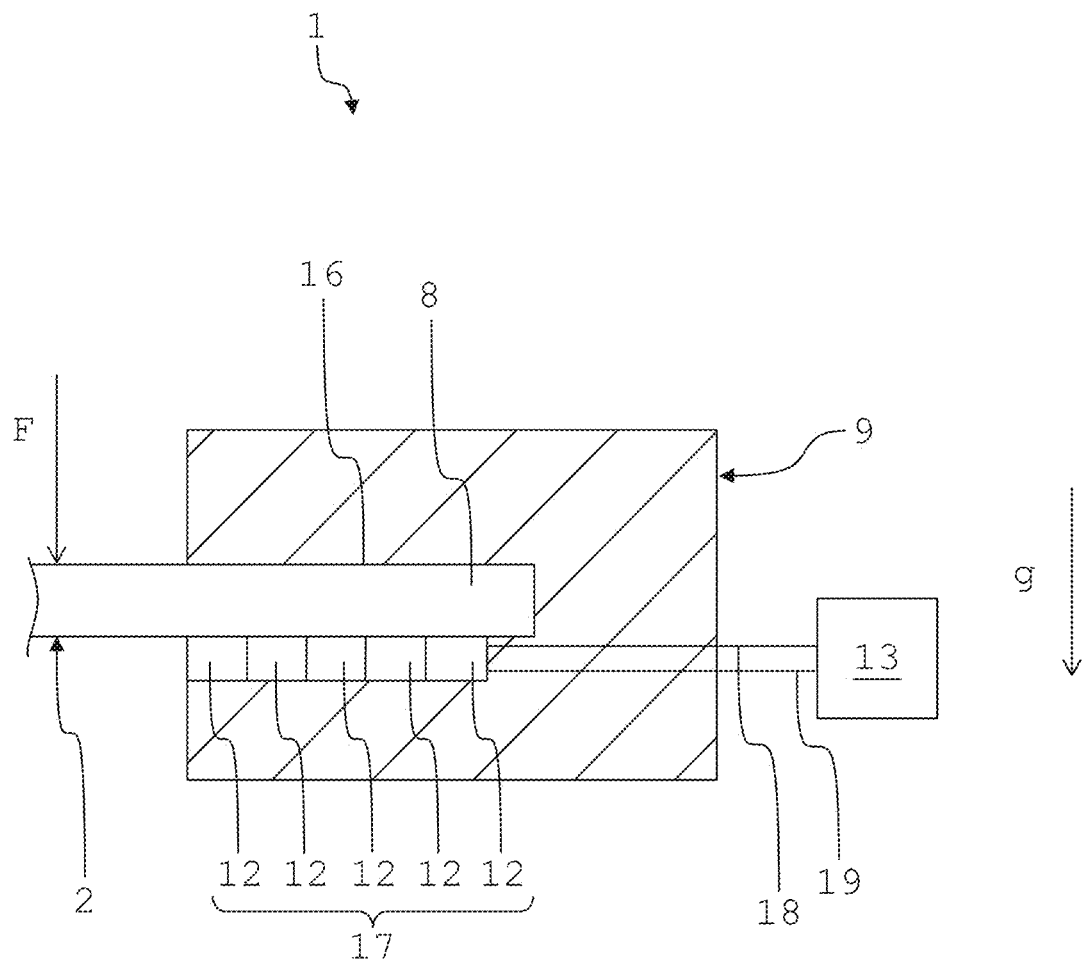
FIG. 4 shows the detailed view IV according to FIG. 1.

FIG. 4 shows the detailed view IV according to FIG. 1. As can be seen from FIG. 4, the second bearing unit 9 may be constructed to receive the second end section 8 of the leaf spring unit 2 therein. For this purpose, the second bearing unit 9 may comprise a receiving pocket 16. For example, the second end section 8 is glued into the receiving pocket 16. However, the connection between the second end section 8 and the second bearing unit 9 may be realized in any other way. In other words, the second bearing unit 9 is constructed analogously to the first bearing unit 7.

The second bearing unit 9 may have an optional piezo element arrangement 17 associated therewith, which is structurally identical to the piezo element arrangement 11. The leaf spring device 1 may comprise either only the piezo element arrangement 11, only the piezo element arrangement 17 or both piezo element arrangements 11, 17. Like the piezo element arrangement 11, the piezo element arrangement 17 comprises a plurality of piezo elements 12 arranged in a matrix-like or mat-like manner. Therefore, the piezo element arrangement 17 may also be referred to as a piezo element mat. Preferably, the piezo element arrangement 17 is bonded into the receiving pocket 16. This allows the leaf spring unit 2 to be replaced without disassembling the piezo element arrangement 17. However, the piezo element arrangement 17 may also be fixedly connected to the end section 8.

Viewed along the direction of gravity g, the piezo element arrangement 17 is placed below the second end section 8. The piezo element arrangement 17 is placed between the second end section 8 and the second bearing unit 9, so that the force F acting on the leaf spring unit 2 also acts on the piezo element arrangement 17. The piezo element arrangement 17 is coupled to the detection and evaluation apparatus 13 by means of lines 18, 19. Alternatively, the piezo element arrangement 17 may also be associated with its own detection and evaluation apparatus 13.

Figure 5:
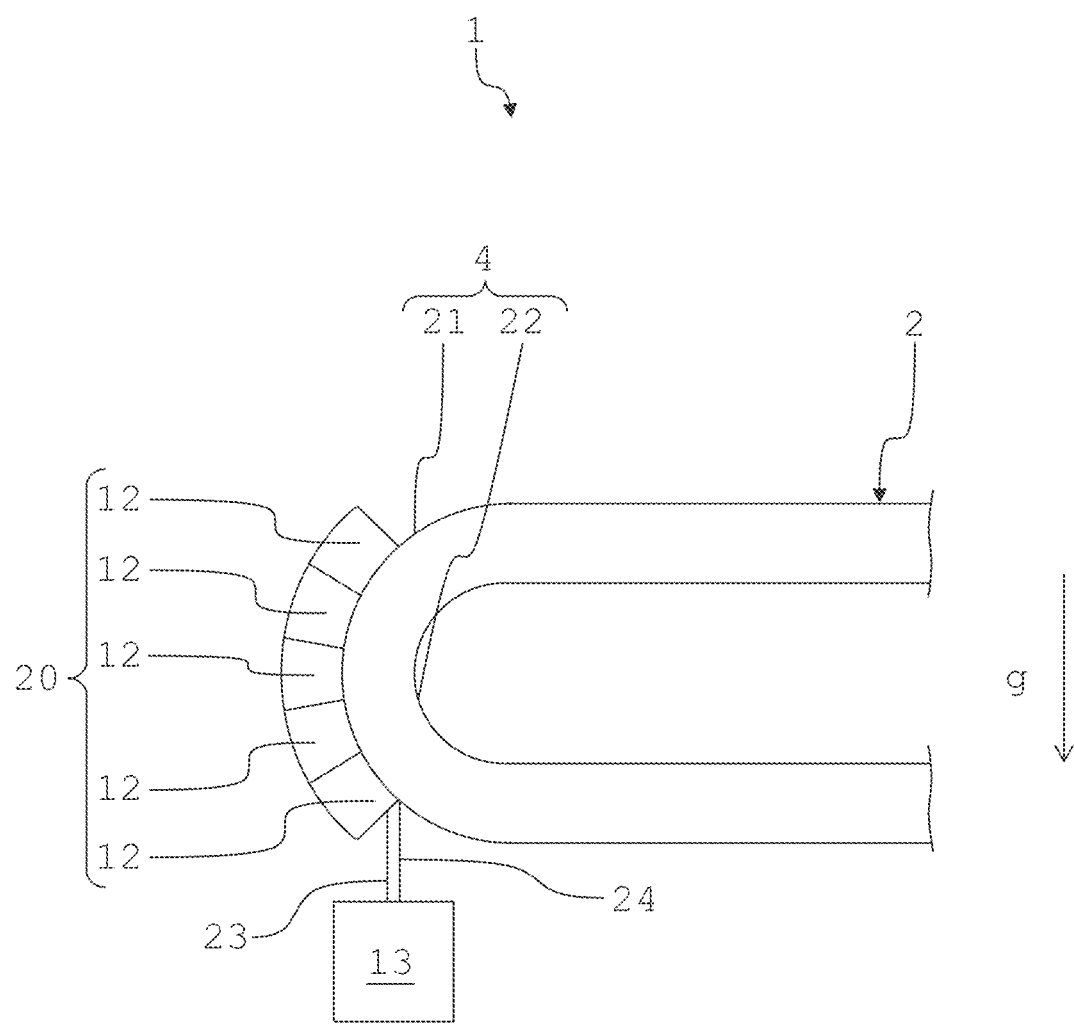
FIG. 5 shows the detailed view V according to FIG. 1.

FIG. 5 shows the detailed view V according to FIG. 1. As FIG. 5 shows, a piezo element arrangement 20 may be externally mounted on one of the deflection sections 4 or on several of the deflection sections 4. The piezo element arrangement 20 may be bonded to the respective deflection section 4. The deflection section 4 includes an outwardly facing outer radius 21 to which the piezo element arrangement 20 is attached, and an inwardly facing inner radius 22 facing away from the outer radius 21. The deflection section 4 is subjected to approximately no deformation. Nevertheless, this even slight deformation of the deflection section is sufficient to sufficiently deform the piezo element arrangement 20.

However, the piezo element arrangement 20 may also be attached to any other region of the leaf spring unit 2, for example to one of the leaf spring sections 3. The piezo element arrangement 20 is constructed in a similar manner to the piezo element arrangements 11, 17. That is, the piezo element arrangement 20 may comprise a plurality of piezo elements 12 arranged in a matrix-like or mat-like manner. The piezo element arrangement 20 may be provided in addition or as an alternative to the piezo element arrangements 11, 17. Lines 23, 24 may be used to couple the piezo element arrangement 20 to the detection and evaluation apparatus 13. Alternatively, the piezo element arrangement 20 may have its own detection and evaluation apparatus 13.

Figure 6:
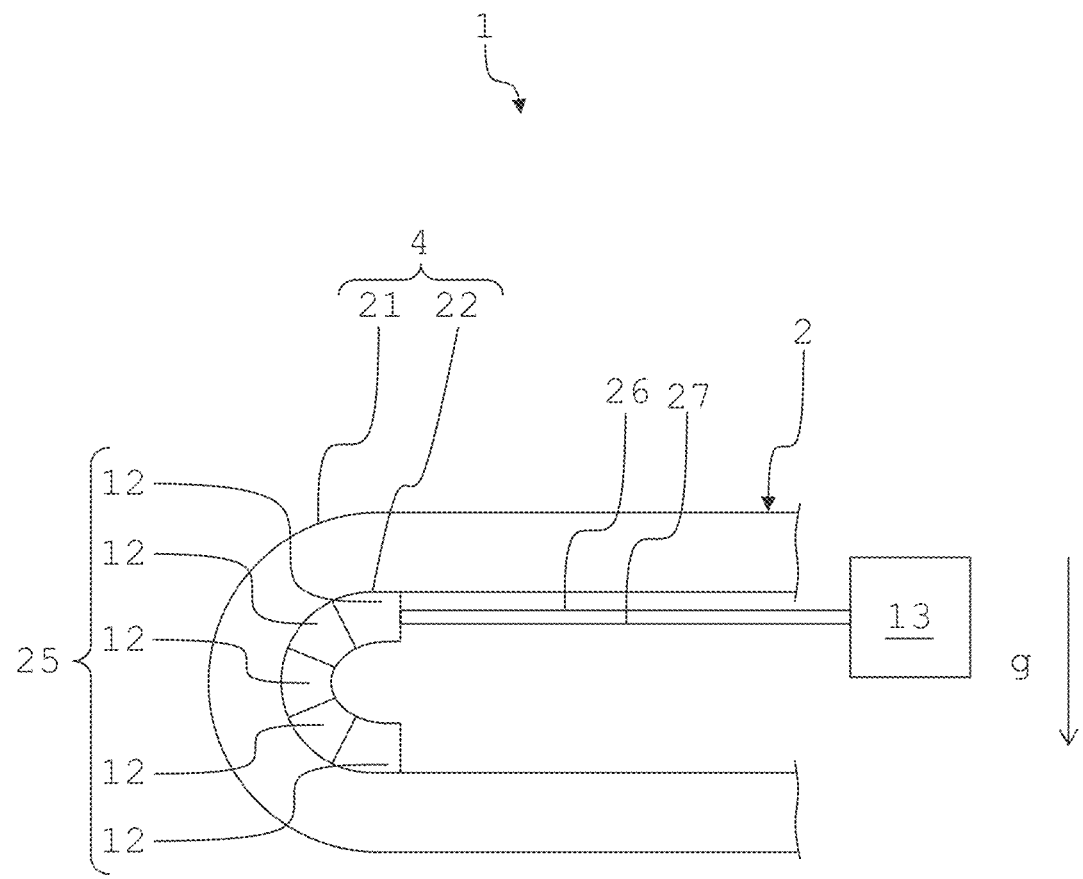
FIG. 6 again shows the detailed view V according to FIG. 1.

FIG. 6 again shows the detailed view V according to FIG. 1 but with a further embodiment of the leaf spring device 1. As FIG. 6 shows, in contrast to FIG. 5, a piezo element arrangement 25 may also be attached to the inside of one of the deflection sections 4 or to several of the deflection sections 4, that is to the inner radius 22. The piezo element arrangement 25 may be bonded to the respective deflection section 4, in particular to the inner radius 22. However, the piezo element arrangement 25 may also be attached to any other region of the leaf spring unit 2, for example to one of the leaf spring sections 3. The piezo element arrangement 25 is constructed in a similar manner to the piezo element arrangements 11, 17, 20. That is, the piezo element arrangement 25 may comprise a plurality of piezo elements 12 arranged in a matrix-like or mat-like manner.

The piezo element arrangement 25 may be provided in addition or as an alternative to the piezo element arrangements 11, 17, 20. By means of lines 26, 27, the piezo element arrangement 25 may be coupled to the detection and evaluation apparatus 13. Alternatively, the piezo element arrangement 25 may have its own detection and evaluation apparatus 13.

Figure 7:
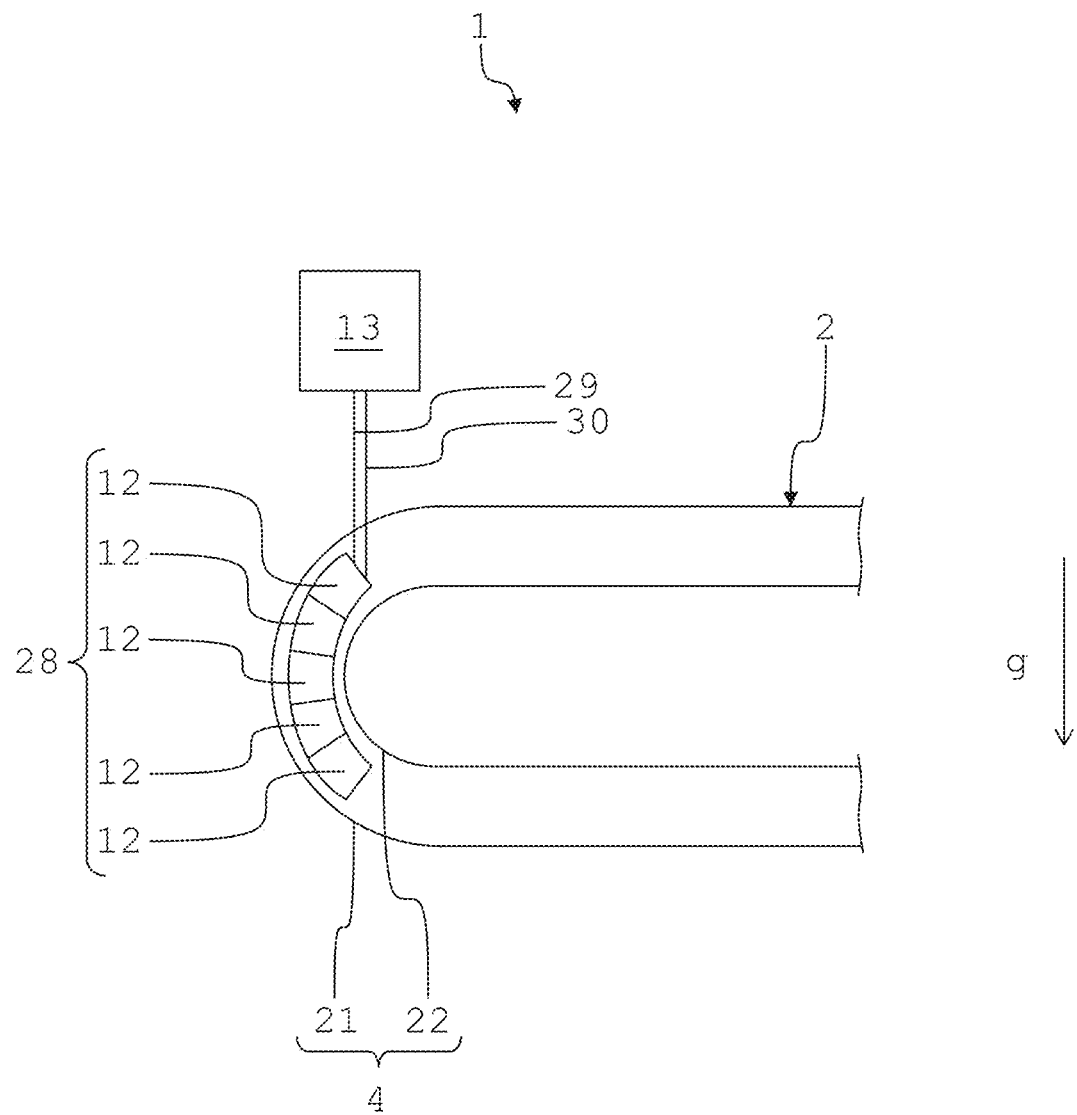
FIG. 7 again shows the detailed view V according to FIG. 1.

FIG. 7 again shows the detailed view V according to FIG. 1 but with a further embodiment of the leaf spring device 1. As FIG. 7 shows, in contrast to FIGS. 5 and 6, a piezo element arrangement 28 may be integrated into the leaf spring unit 2, in particular into one of the deflection sections 4. "Integrated" in the present context means that the piezo element arrangement 28 is surrounded, at least in sections, by material of the leaf spring unit 2. For example, the piezo element arrangement 28 may be covered only by an outermost or innermost layer of the fiber composite plastic, of which the leaf spring unit 2 is made.

Preferably, the piezo element arrangement 28 is provided on one or more of the deflection sections 4. However, the piezo element arrangement 28 may also be provided at any other region of the leaf spring unit 2, for example at one of the leaf spring sections 3. The piezo element arrangement 28 is constructed in a similar manner to the piezo element arrangements 11, 17, 20, 25. That is, the piezo element arrangement 28 may comprise a plurality of piezo elements 12 arranged in a matrix-like or mat-like manner.

The piezo element arrangement 28 may be provided in addition or as an alternative to the piezo element arrangements 11, 17, 20, 25. By means of lines 29, 30, the piezo element arrangement 28 may be coupled to the detection and evaluation apparatus 13. Alternatively, the piezo element arrangement 28 may have its own detection and evaluation apparatus 13.

Figure 8:
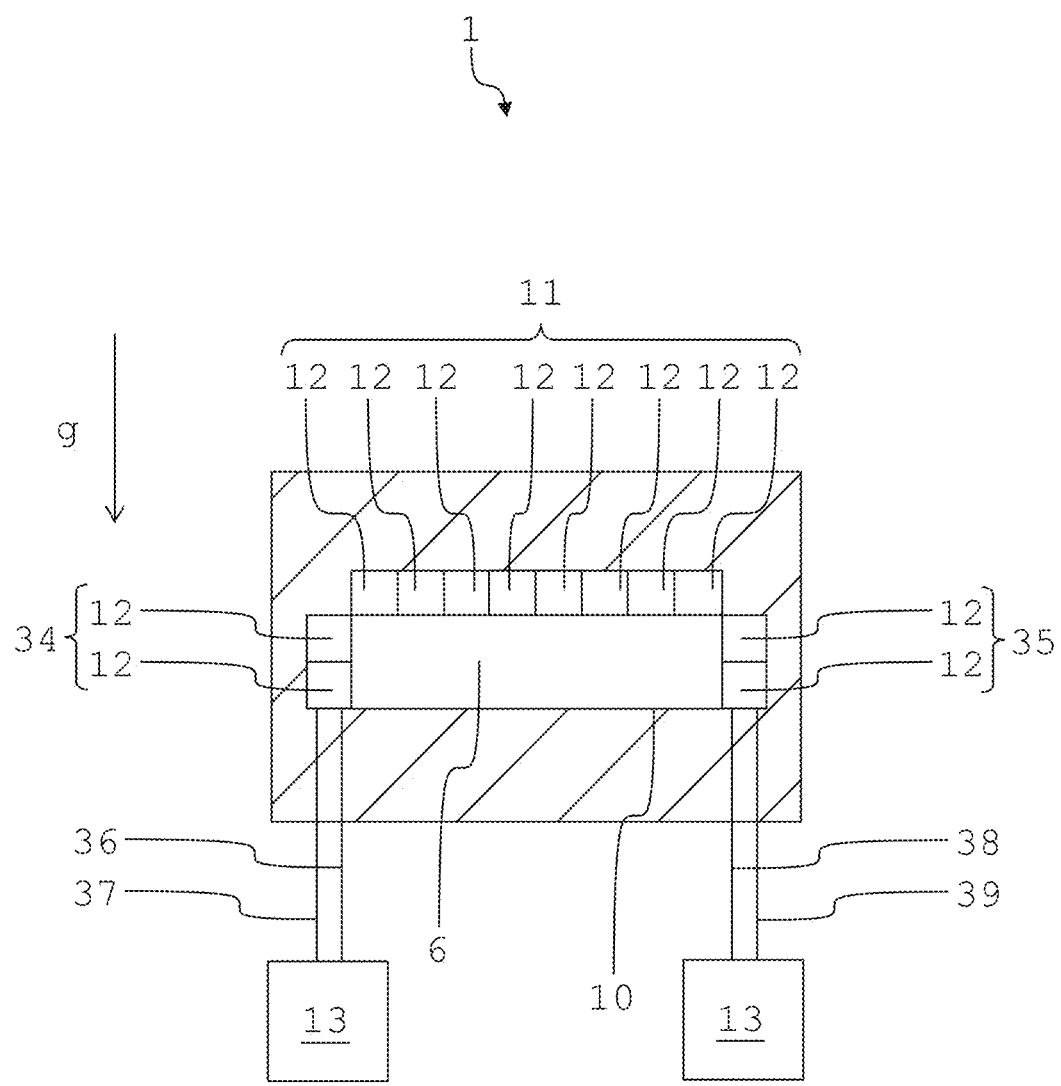
FIG. 8 shows a sectional view of the leaf spring device according to the sectional line IIX-IIX of FIG. 3.

FIG. 8 shows the sectional view IIX-IIX according to FIG. 3 with a further embodiment of the leaf spring device 1. As FIG. 8 shows, further piezo element arrangements 34, 35 may be provided laterally on the end section 6. These may be glued into the receiving pocket 10. The second bearing unit 9 may comprise corresponding piezo element arrangements 34, 35. The piezo element arrangements 34, 35 are optional. Advantageously, the piezo element arrangements 34, 35 can be used to detect transverse accelerations. Each piezo element arrangement 34, 35 comprises a plurality of piezo element elements 12 arranged in a mat-like or matrix-like manner.

In this regard, as shown in FIG. 8, two piezo element arrangements 34, 35 may be provided such that the end section 6 is arranged between the piezo element arrangements 34, 35. However, only one piezo element arrangement 34, 35 may also be provided. The piezo element arrangements 34, 35 may be provided in addition to the piezo element arrangements 11, 17, 20, 25, 28.

By means of lines 36, 37, the piezo element arrangement 34 may be coupled to the detection and evaluation apparatus 13. Alternatively, the piezo element arrangement 34 may have its own detection and evaluation apparatus 13. By means of lines 38, 39, the piezo element arrangement 35 may be coupled to the detection and evaluation apparatus 13. Alternatively, the piezo element arrangement 35 may also comprise its own detection and evaluation apparatus 13.

The piezo element arrangements 11, 17, 20, 25, 28 can be used for energy recovery or recuperation. For this purpose, the piezo element arrangement 11 is provided at least at the first bearing unit 7. Additionally or alternatively, the piezo element arrangement 17 may be provided at the second bearing unit 9. When the leaf spring unit 2 compresses or when the leaf spring unit 2 moves, the piezo element arrangements 11, 17 are elastically deformed, whereby these deformation energy is converted into electrical energy. This can be supplied to a motor vehicle having such a leaf spring device 1.

In particular, the piezo element arrangements 11, 17 generate an electric voltage or a current respectively due to the deformation. The piezo element arrangements 11, 17 can thus be used as a voltage or current source. The generated voltage or current can, for example, be fed back to the motor vehicle as part of the recuperation process. For example, an energy storage device, in particular a battery, can be recharged. In this case, the detection and evaluation apparatus 13 may be suitable for supplying electrical energy generated by the piezo element arrangements 11, 17 to the energy storage device. The detection and evaluation apparatus 13 may in particular be or comprise a charger.

In order to increase the energy harvesting, the piezo element arrangements 20, 25, 28 or at least one of the piezo element arrangements 20, 25, 28 may additionally be provided. However, this is not mandatory. Preferably, the piezo element arrangements 20, 25, 28 are provided in low-motion regions of the leaf spring unit 2, namely in the deflection sections 4, in order to generate energy from small movements or deformations of the leaf spring unit 2.

The piezo element arrangements 11, 17, 20, 25, 28 may also be used for data generation or data acquisition, in particular for generating or acquiring data on the movement, deformation and loading of the leaf spring unit 2. Again, at least the piezo element arrangement 11 associated with the first bearing unit 7 is provided. The more piezo element arrangements 11, 17, 20, 25, 28 are provided, the better the data quality and the accuracy of the motion detection of the leaf spring unit 2.

In addition to feeding the energy generated by means of the piezo element arrangements 11, 17, 20, 25, 28 back into the motor vehicle, this energy can also be used for data transmission and/or for controlling a damper 31 (FIGS. 1 and 2) of the motor vehicle. In the latter case, the control of the damper 31 can be performed, for example, without coupling to the motor vehicle. In other words, the piezo element arrangements 11, 17, 20, 25, 28 and the damper 31 work together autonomously. The leaf spring device 1 and the damper 31 together form a leaf spring and damper arrangement 32 of a motor vehicle 33 as previously mentioned, which is shown only very schematically in FIGS. 1 and 2. The leaf spring and damper arrangement 32 preferably operates autonomously, that is without external power supply or control.

During operation of the leaf spring device 1, for example when the motor vehicle 33 is driving, by monitoring and comparing the voltages and currents of the piezo element arrangements 11, 17, 20, 25, 28, for example, information regarding the load of the motor vehicle 33 and the current load on the leaf spring unit 2 can be obtained. These can be used, for example, to dynamically adjust a damper characteristic of the damper 31 and adapt it to the current driving situation. Due to the fact that the piezo element arrangements 11, 17, 20, 25, 28 themselves generate a voltage, it is possible to implement data transmission without additional wiring. This leads to a cost saving. Furthermore, it is possible to realize a variable characteristic of the damper 31 without a voltage supply from the motor vehicle 33, since the required energy is supplied by the piezo element arrangements 11, 17, 20, 25, 28.

For data transmission, the piezo element arrangements 11, 17, 20, 25, 28 may be coupled to suitable devices for data transmission. The detection and evaluation apparatus 13 is such a device or may comprise such a device. This coupling may be independent of a mounting location of the piezo element arrangements 11, 17, 20, 25, 28 and/or a number of the piezo element arrangements 11, 17, 20, 25, 28. By means of this coupling, real-time data on the loading of the leaf spring device 1 can be obtained. By means of a comparison of the data of a plurality of leaf spring devices 1 of the motor vehicle 33, a derivation of a load condition of the motor vehicle 33 can be obtained, which allows an adjustment of characteristics of the damper 31 for comfort gain and/or for driving safety gain.

Advantageously, a comparison of voltages and/or currents of one or more of the piezo element arrangements 11, 17, 20, 25, 28 of one or more leaf spring devices 1 of the motor vehicle 33 can be used to determine the loading state of the motor vehicle 33 or a current compression travel of the respective leaf spring device 1. Based on the compression travel and/or the loading and/or a frequency of the supplied voltages, the characteristic curve of the damper 31 can be adjusted in a load-sensitive and dynamic manner. The electrical energy obtained can be used for recuperation and/or for data transmission.

Furthermore, the voltage generated by the piezo element arrangements 11, 17, 20, 25, 28 can also be used, for example, to modify the properties of magnetorheological or electrorheological materials and thus achieve, for example, an improvement in acoustics by integrating corresponding materials between the leaf spring device 1 and the motor vehicle 33. Advantageously, this modification of the properties of the magnetorheological or electrorheological materials can again be carried out without external energy supply and, in addition, dynamically and/or selectively. From the voltage or current supplied by one or more of the piezo element arrangements 11, 17, 20, 25, 28, it is possible to determine the load of the motor vehicle 33, so that, for example, in the event of an overload of the motor vehicle 33, the latter is no longer ready to be driven, which can be indicated to the driver by a corresponding signal.

Although the present invention has been described with reference to examples of embodiments, it can be modified in a variety of ways.

LIST OF REFERENCE SIGNS

1 Leaf spring device
2 Leaf spring unit
3 Leaf spring section
4 Deflection section
5 Region
6 End section
7 Bearing unit
8 End section
9 Bearing unit
10 Receiving pocket
11 Piezo element arrangement
12 Piezo element
13 Detection and evaluation apparatus
14 Line
15 Line
16 Receiving pocket
17 Piezo element arrangement
18 Line
19 Line
20 Piezo element arrangement
21 Radius
22 Radius
23 Line
24 Line
25 Piezo element arrangement
26 Line
27 Line
28 Piezo element arrangement
29 Line
30 Line
31 Damper
32 Leaf spring and damper arrangement
33 Motor vehicle
34 Piezo element arrangement
35 Piezo element arrangement
36 Line
37 Line
38 Line
39 Line
g Direction of gravity
F Force

The invention claimed is:

1. A leaf spring device for a motor vehicle, comprising:
a leaf spring unit made of a fiber composite plastic;
a piezo element arrangement which is attached to the leaf spring unit; and
a bearing unit;
wherein the piezo element arrangement is configured to generate an electric voltage in response to a deformation of the leaf spring unit;
wherein the piezo element arrangement is attached to an end section of the leaf spring unit provided at an end of the leaf spring unit;
wherein the bearing unit comprises a receiving pocket;
wherein the end section is received within the receiving pocket; and wherein the piezo element arrangement is sandwiched between the end section and a wall of the receiving pocket.

2. The leaf spring device according to claim 1, characterized in that
the leaf spring unit comprises a first end section to which a first piezo element arrangement is
attached and a second end section to which a second piezo element arrangement is attached.

3. The leaf spring device according to claim 1, characterized in that
the leaf spring unit comprises a plurality of leaf spring sections and a plurality of deflection
sections, and in that in each case one deflection section connects two adjacent leaf spring sections to one another.

4. The leaf spring device according to claim 3, characterized in that
the deflection sections comprise a higher stiffness than the leaf spring sections.

5. The leaf spring device according to claim 2, characterized in that
the piezo element arrangement is attached to at least one of the deflection sections.

6. The leaf spring device according to claim 5, characterized in that
the piezo element arrangement is attached to an outer radius of the at least one deflection section,
and/or in that the piezo element arrangement is attached to an inner radius of the at least one deflection section, which inner radius faces away from the outer radius.

7. The leaf spring device according to claim 3, characterized in that
the piezo element arrangement is arranged inside at least one of the deflection sections.

8. The leaf spring device according to claim 1, characterized in that
the piezo element arrangement comprises a plurality of piezo elements arranged in a form of a matrix.

9. The leaf spring device according to claim 1, characterized by
a detection and evaluation apparatus which is configured to detect and evaluate the electrical voltage generated by the piezo element arrangement in order to generate data which describe the deformation of the leaf spring unit.

10. The leaf spring device according to claim 9, characterized in that
the detection and evaluation apparatus is configured to describe a loading state and/or a deflection of the leaf spring unit.

11. The leaf spring device according to claim 9, characterized in that
the electrical voltage generated by the piezo element arrangement serves to transmit the data.

12. A leaf spring and damper assembly comprising a damper and a leaf spring device according to claim 1, wherein the piezo element arrangement is operatively connected to the damper in such a way that a damper characteristic of the damper changes as a function of the electrical voltage.

13. The leaf spring and damper assembly according to claim 12, characterized in that
the piezo element arrangement and the damper are operatively connected in such a way that the piezo element arrangement and the damper cooperate autonomously.

* * * * *